3,435,148
Patented Mar. 25, 1969

3,435,148

TIME DIVISION MULTIPLEX PULSE CODE MODULATION COMMUNICATION SYSTEM BY PULSE DISTRIBUTION TRANSMISSION

Hiroki Yoshine, Tokyo-to, Japan, assignor to Kabushiki Kaisha Hitachi Seisakusho, Tokyo-to, Japan, a joint-stock company of Japan Continuation-in-part of application Ser. No. 218,713, Aug. 22, 1962. This application Sept. 26, 1966, Ser. No. 593,252
Int. Cl. H04j 3/02
U.S. Cl. 179—15 8 Claims

ABSTRACT OF THE DISCLOSURE

A time-division, multiplex pulse-amplitude-modulation (PCM) communication system, wherein signals to be transmitted are successively converted into a PCM signal by a sampling and multiplexing circuit and by a coding circuit. The PCM signal obtained is distributed to a plurality of transmission lines, and the distribution is carried out with respect to each bit of the coded pulse train representing each transmitting signal or to each channel slot of the transmitting signals.

This application is a continuation-in-part of my copending application Ser. No. 218,713, filed Aug. 22, 1962, and now abandoned.

This invention relates to communication systems of the pulse-code-modulation type, and more particularly to a communication system wherein a large number of transmitting signals are modulated into coded pulses and transmitted as time-division multiplex signals.

A pulse code modulation system (hereinafter referred to as PCM) is a superior communication system having such advantages as being almost completely free from crosstalk and noise in repeating and having extremely high stability. This system however, has heretofore not been reduced to practice to a great extent because of a certain difficulty, as will be described in detail hereinafter, which briefly stated, is an intricate and involved apparatus and high manufacturing cost.

Accordingly, it is a general object of the present invention to eliminate or greatly reduce such difficulty.

More specifically, it is an object of the invention to provide a new and improved communication system of the time-division, multiplex PCM type composed of a greatly simplified apparatus of substantially low cost.

Another object of the invention is to provide an improved communication system, according to which the transmitting and receiving terminal equipments can be greatly simplified and lowered in manufacturing cost without any reduction of the transmission capacity.

According to the invention, signals to be transmitted are converted into a time-division, multiplex pulse-amplitude-modulation signal by means of a sampling and multiplexing circuit, and are successively converted into a time-division, multiplex PCM signal by means of a coding circuit. After that, the PCM signal obtained from the coding circuit is distributed to a plurality of transmission lines. Such distribution of the PCM signal is carried out with respect to each bit of the coded pulse train representing each transmitting signal, or to each channel slot of the transmitting signals.

The nature and detail of the present invention will be more clearly apparent from the following description, beginning with a brief consideration of the prior art for the purpose of comparative description, when taken in connection with the accompanying drawing, in which.

In the PCM communication system, as is well known, a signal to be transmitted is required to be converted into a coded-pulse signal, for example, binary coded-pulse signal. An example used for such purpose is the so-called beam coder tube, which is introduced in detail in the publication "Proceedings of the IRE"; September 1960, Vol. 48, No. 9; pp. 1546–1561. This beam coder tube is provided with an aperture code plate, and such plate is repeatedly hit by a ribbon beam which is projected onto a predetermined position of the plate in accordance with an instant amplitude of the transmitting signal. The electrons passing through the aperture of the plate are caught by the collectors positioned behind each of the apertures. Consequently, time-division pulse trains, each of which represents the content of a certain bit of the binary code of the transmitting signal, can be taken out from the collectors.

Each of the time-division pulse trains from the beam coder tube is transmitted, respectively, through one of parallel transmission lines provided corresponding to each bit within the binary code. In the multiplex communication, a plurality of beam coder tubes is provided for every communication channel, and two or more groups of the time-division pulse trains obtained from the different transmitting signal sources are interlaced for every bit of the binary code for transmission over the same transmission lines.

However, the beam coder tube is very expansive in manufacturing cost, and it therefore is extremely expensive to provide a large number of the coder tubes for each communication channel in the multiplex communication. Accordingly, the pulse-code-modulation system using such beam coder tubes has no use in industrial practice.

Figure 1:
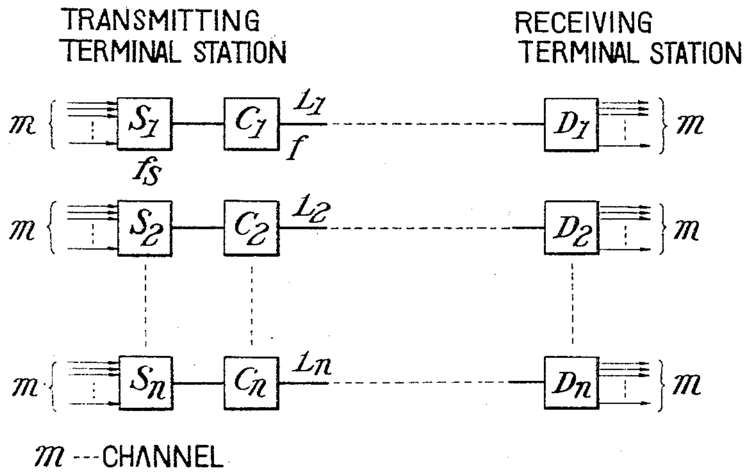
FIGURE 1 is a block diagram showing the compositional arrangement of a time-division, multiplex pulse code modulation system of conventional design.

Such disadvantage as mentioned above can be avoided to some extent by using a time-division, multiplex PCM communication system shown in FIGURE 1. In this system, the transmitting signals of $m$ channels are sampled, in successively phase-shifted relation, and multiplexed by a sampling and multiplexing circuit $S_1$ for conversion into a multiplex pulse-amplitude-modulation signal. This multiplex pulse-amplitude-modulation signal is successively supplied to a coder $C_1$ and coded into a time-division, multiplex pulse-code-modulation signal of a degree of multiplex of $m$. The output of the coder $C_1$ is transmitted through a transmission line $L_1$ to the receiving side, where it is decoded by a decoder $D_1$ to complete the communication operation.

According to such a system, it is unnecessary to use any beam coder tube which is expensive in cost. In this case, however, the maximum number of channels is limited by the capacity of the transmission line. That is to say, the repeating frequency $f$ of the time-division multiplex PCM signal transmitted through the transmission line $L_1$ is generally expressed by the product of the number of channels $m$ (degree of multiplexing), the sampling frequency $f_s$, and number of code elements or bits B; ($f=m\times f_s\times B$). This frequency $f$ is limted by such factors as the band of the transmission line $L_1$, noise and characteristics of the repeater, and is not allowed to exceed a certain frequency $f_e$ (available, i.e., transmittable, distortion-free, frequency). Accordingly, in order to maintain the condition $f<f_e$, if the sampling frequency $f_s$ and the number of code bits B are to be constant, the number of channels $m$ will be also limited, and an allowable number of channels $m_e$ will exist.

For this reason, in the case of transmitting a large number of signals, larger than the allowable number of channels $m_e$, a further large number of sampling and multiplexing circuits $S_2, S_3, \ldots S_n$, coders $C_2, C_3, \ldots C_n$, and decoders $D_2, D_3, \ldots D_n$ are to be installed, and the system is so arranged that the signals of $n\times m_e$ channels are to be divided into $n$ blocks, and coding and decoding must be accomplished for each block. For example, if the transmittable distortion-free frequency $f_e$ of one transmission line is 1.54 mc., the sampling frequency $f_s$ is 8 kc., and the number of bits B is 8, the maximum channel number is as follows:

$$m=\frac{f_e}{f_s\times B}$$

$$=\frac{1.54\text{ mc.}}{8\text{ kc.}\times 8}=24$$

Consequently, in order to transmit the transmitting signals of 192 channels, the number of the blocks of the system is required to be 192/24=8. Then, eight sets of the coding circuits and the decoding circuits must be provided.

Accordingly, although this system has the advantage that is is unnecessary to provide a number of beam coder tubes which are expensive in cost, it still cannot satisfy the requirement that the communication of large numbers of transmitting signals must be accomplished by an apparatus having a relatively simple structure. That is to say, in the system described above, when the number of transmitting signals (number of channels) is to be increased above the number capable of being transmitted by the transmission line of one, a large number of similar blocks must also be installed. For this reason, the transmitting terminal and receiving terminal devices become complicated and entail much higher cost than apparatus of other systems of the same transmission capacity. This is the reason that the PCM system heretofore has not been reduced to practice to any great extent.

FIGURE 1 shows only the principal parts, while other necessary parts such as a digit pulse generator or timing pulse generator are omitted. A description of such a system as mentioned above may be found in the publication "Bell System Technical Journal" Vol. 41, No. 1, (1962-01), pp. 1–24.

According to the invention, all transmitting signals are converted into a time-division, multiplex pulse-amplitude-modulation signal by a sampling and multiplexing circuit and are successively converted into a time-division, multiplex PCM signal by a coding circuit. The PCM signal obtained from the coding circuit is successively distributed to a plurality of transmission lines. No expensive beam coder tube is used in the invention because the transmitting signals are at once converted in the pulse-amplitude-modulation signal. Means for interlacing the PCM signals also are not used in the invention because all transmitting signals have already been converted into the time-division, multiplex signal before they are coded by the coding circuit.

Furthermore, it should be noted that it is a very important feature of the invention to use a distributing means for distribution of the time-division, multiplex PCM signal to a plurality of transmission lines. The use of such distritbuting means renders possible the reduction of the number of the sampling and multiplexing circuits, the coding circuits and the decoding circuits, even if a large number of parallel transmission lines is provided for transmitting a number of transmitting signals larger than the allowable number of channels $m_e$.

For example, in the embodiment of FIGURE 2 which will be described hereinafter in detail, the distribution of the PCM signal is carried out with respect to each bit of the coded pulse train representing each transmitting signal. The same number of transmission lines is provided as that of the bits B to be used, but the number of the sampling and coding circuit and decoding circuit is only one. If again the same condition as mentioned above is considered, the number of bits B is 8, then the number of the transmission lines is to be 8 which is the same number as that in FIGURE 1. However, since only one terminal equipment is provided, such equipment is required to be operative at a frequency of eight times the frequency in the terminal equipments of the conventional system as mentioned above. If such frequency $f_c$ in case of the present invention is 12,288 mc., the frequency of the signals through the transmission lines becomes 1.54 mc. because the pulse train generated in the terminal equipment is distributed to eight transmission lines. Consequently, the frequency at the transmission lines does not exceed the transmittable distortion-free frequency $f_e$ (=1.5 mc.).

The terminal equipment (the sampling and multiplexing circuit, the coding circuit and the decoding circuit) can easily be assembled so as to be operative in such a condition that the repeating frequency of the pulse train applied thereto is much higher than the transmittable distortion-free frequency $f_e$ of the transmission line. Accordingly, it becomes possible to reduce the number of this equipment without any reduction of the transmission capacity.

Figure 2:
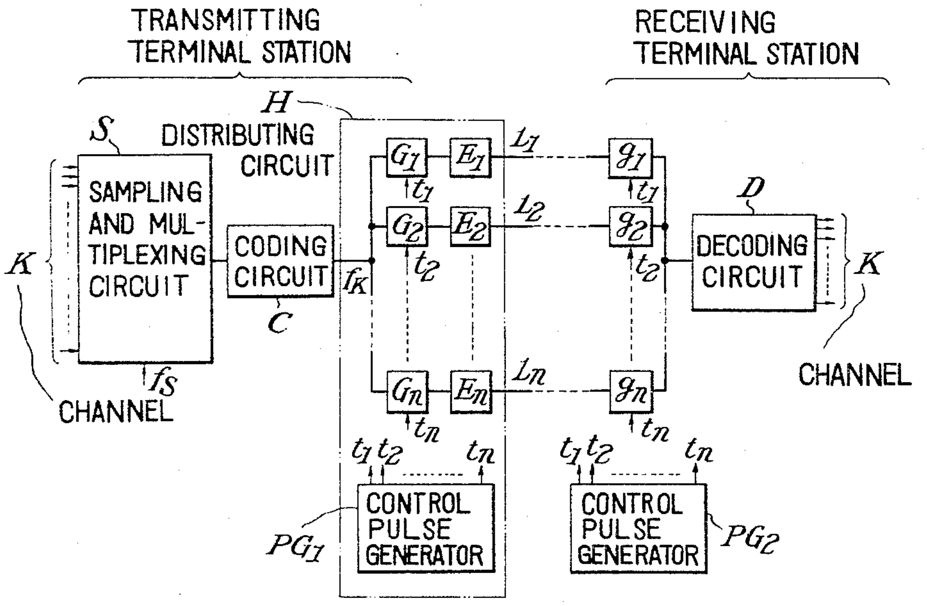
FIGURE 2 is a block diagram showing the compositional arrangement of one embodiment of the present invention.

Referring now to FIGURE 2 which illustrates the compositional arrangement of one representative embodiment of the present invention, at the transmitting terminal, transmitting signals of K channels are sampled by a sampling and multiplexing circuit S in successively phase-shifted relation to convert them into a multiplex pulse-amplitude-modulation signal. This signal is supplied to a coding circuit and is coded to a time-division, mulitplex PCM signal of a degree of multiplex of K. This operation is similar to that of each of the sampling and multiplexing circuits of the case shown in FIGURE 1, but in this case of FIGURE 2, the number of channels K is selected to be larger than that of available channels $m_e$ of one transmission line. The aforesaid time-division, multiplex PCM signal obtained from the coding circuit C is a series, binary pulse train.

The circuit arrangement described above is the same as that of one block of the conventional arrangement illustrated in FIGURE 1, but the pulse repeating frequency $f_k$ of the time-division, multiplex PCM signal obtained from the coding circuit becomes higher than the transmittable distortion-free frequency $f_e$ of one transmission line. (In this case $f_k$ becomes $K\times f_s\times B$, where the sampling frequency $f_s$ and the number of bits B are the same as those in the case of FIGURE 1.)

Figure 3:
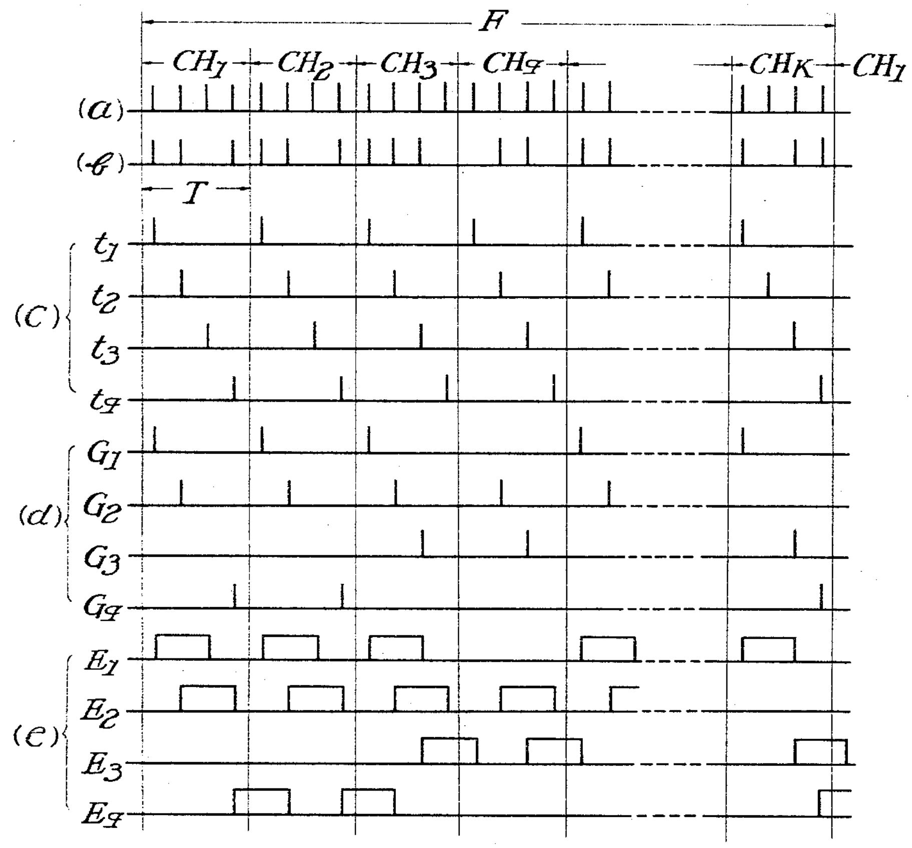
FIGURE 3 is a pulse waveform diagram, in representative form, showing pulse waveforms at various parts of the embodiment of FIGURE 2.

In FIGURE 3, the waveform designated by $a$ indicates a clock pulse train of a repeating freqeuncy $f_k$, which is used in the coding circuit C. The waveform designated by $b$ indicates one example of the time-division, multiplex PCM pulse train $b$ consisting of a plurality of groups of a binary 4-bit ($B=4$) pulse train. In $b$, the letter T designates the time interval of existence of the PCM pulse train for each channel, this interval being generally referred to as a time slot. The letter F designates the time interval of existence of the PCM pulse train for K channels, during which the binary pulse groups for each channel are aligned and multiplexed in sequential order, this time interval being generally referred to as one frame.

Referring again to FIGURE 2, the transmitting terminal is further provided with a distributing circuit H for distributing the time-division, multiplex PCM pulse train of K channels (FIGURE 3(*b*)) as mentioned above, to $n$ transmission lines. This distributing circuit H includes gating $G_1$, $G_2$, . . . $G_n$ and a control pulse generator $PG_1$. The control pulse generator $PG_1$ generates timing pulses for distribution and controls the opening and closing of the gating circuits. That is to say, the control pulse generator $PG_1$ has $n$ pulse output terminals $t_1$, $t_2$, . . . $t_n$, through each of which a pulse train of a repeating frequency of $f_k/n$ is generated successively at a staggered interval equal to one cycle of the clock pulse frequency $f_k$ to control the opening and closing of each of the abovesaid gating circuits in turn.

Referring to FIGURE 3, the group of waveforms designated by $c$ indicates the pulse trains generated through terminals $t_1$, $t_2$, $t_3$ and $t_4$, (in this case, $n=4$). The waveforms $d$ indicate the output pulse trains of the gating circuits $G_1$, $G_2$, $G_3$ and $G_4$ which are controlled by the said pulse trains $c$. The pulse widths of these output pulse trains $d$ of the gating circuits $G_1$, $G_2$, $G_3$ and $G_4$ are enlarged by pulse width stretching circuits $E_1$, $E_2$, $E_3$ and $E_4$, for which blocking oscillators, for example, are used. The outputs of these pulse width stretching circuits are indicated by $e$ in FIGURE 3.

Figure 6:
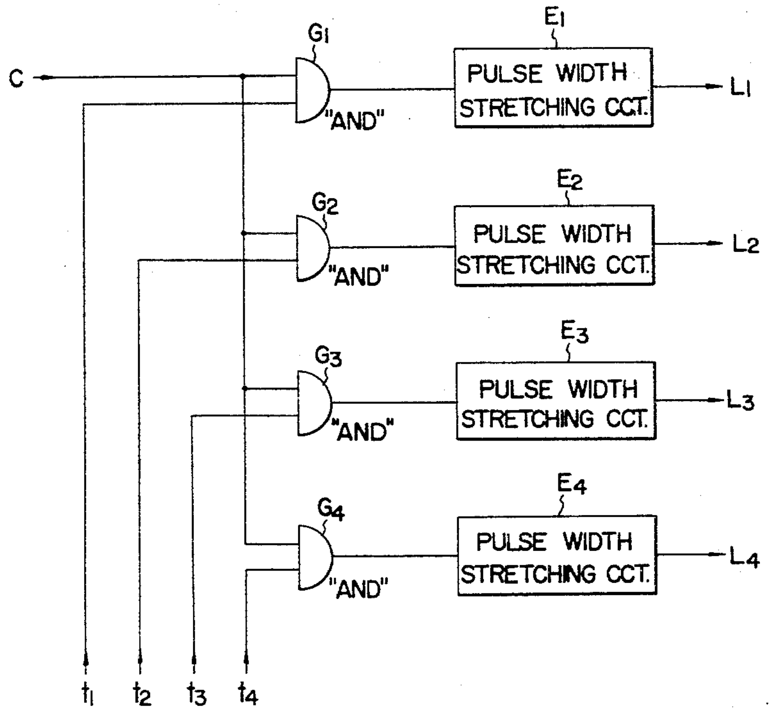
FIGURE 6 is a block diagram showing the detailed arrangement of the distributing circuit in FIGURE 2.

FIGURE 6 illustrates the distributing circuit H in more detail. In this case, the gating means consists of four "AND" gates $G_1$, $G_2$, $G_3$, and $G_4$, and the pulse width stretching means consists of four stretching circuits $E_1$, $E_2$, $E_3$ and $E_4$. The time-division, multiplex PCM signal which is the output of the coding circuit C in FIGURE 2 is commonly supplied to one terminal of the "AND" gate $G_1$, $G_2$, $G_3$ and $G_4$. The control pulses $t_1$, $t_2$, $t_3$ and $t_4$ which are generated in the control pulse generator $PG_1$ in FIGURE 2 are supplied respectively to another terminal of the "AND" gates. Since the control pulses $t_1$, $t_2$, $t_3$ and $t_4$ have such waveform as shown in FIGURE 3(*c*) respectively, each of the "AND" gates is opened for each time slot T by one of the control pulses within a predetermined, staggered time. Consequently, the bit pulses of each channel are distributed for a particular bit, and are supplied to the pulse width stretching circuits, selectively. Thus, it is possible to take out from such stretching circuits a plurality of pulse signals stretched in width.

The pulse signals which have been distributed to $n$ paths and stretched in width in the abovementioned manner are transmitted through the $n$ transmission lines $L_1$, $L_2$, . . . $L_n$ to the receiving side. The pulse repeating frequency of each transmission line in this case is such that $$f=f_k/n<f_e$$

and, similarly as in the case illustrated in FIGURE 1, becomes less than the transmittable distortion-free frequency $f_e$, the fact notwithstanding that only a single set of the sampling and multiplexing circuit and the coding circuit are present.

At the receiving terminal the pulse signals received through the transmission lines $L_1$, $L_2$, . . . $L_n$ are reduced in pulse width by gating circuits $g_1$, $g_2$, . . . $g_n$. For this purpose, a control pulse generator $PG_2$ is provided at the terminal. This pulse generator controls the gating circuits $g_1$, $g_2$, . . . $g_n$ so as to convert the received signals to narrow pulse trains, the width of which is the same as that of the waveforms prior to stretching by the pulse width stretching circuits $E_1$, $E_2$, . . . $E_n$ of the transmitting terminal (see FIGURE 3(*d*)).

The above-mentioned pulse $PG_2$ generates pulse trains similar to those of the control pulse generator $PG_1$ of the distributing circuit H at the transmitting terminal. Accordingly, by combining the output pulse trains of the gating circuits $g_1$, $g_2$, . . . $g_n$, a time-division, multiplex PCM signal can be regenerated which is the same as the output signal of the coding circuit C at the transmitting terminal (FIGURE 3(*b*)). This PCM signal is supplied to a decoding circuit D according to which the transmitting signals of K channels can be regenerated.

Under the condition that the number of channels K is 192, the number of bits B for each channel is 8, and the transmittable distortion-free frequency $f_e$ of each transmission line is 1.54 mc., this condition being the same as that considered in the case of FIGURE 1; the terminal equipment (the sampling and multiplexing circuit, the coding circuit and the decoding circuit) are required to be operative at the repeating frequency $f_k$ of 12.288 mc. when the sampling frequency $f_s$ is selected as 8 kc. which is the same value as that in FIGURE 1. In other words, if the frequency $f_k$ is selected as 12.288 mc., the frequency $f_e$ becomes 1.54 mc., that is:

$$f_e=f_k/B=12.288\div8=1.54 \text{ (mc.)}$$

It will be apparent from the above-mentioned descriptions that it is possible to maintain the frequency of the transmission lines at the value of the transmittable distortion-free frequency $f_e$ by using a single set of terminal equipment which is operative at the frequency higher than $f_e$ and by means of the distributing circuit H.

According to the invention, it is still impossible to reduce the number of the transmission lines. Therefore, the reduction and the cost of the terminal equipment effectively lowers the total cost of the whole communication system.

Although the above-described embodiment of the invention illustrates the case wherein each bit pulse within each time slot is distributed to a suitable plurality of transmission lines, it is also possible to distribute all of the pulses within each time slot to a suitable plurality of transmission lines. The compositional arrangement of the system in this latter case is shown in FIGURE 4, and the waveforms at various parts thereof are indicated in FIGURE 5.

Figure 4:
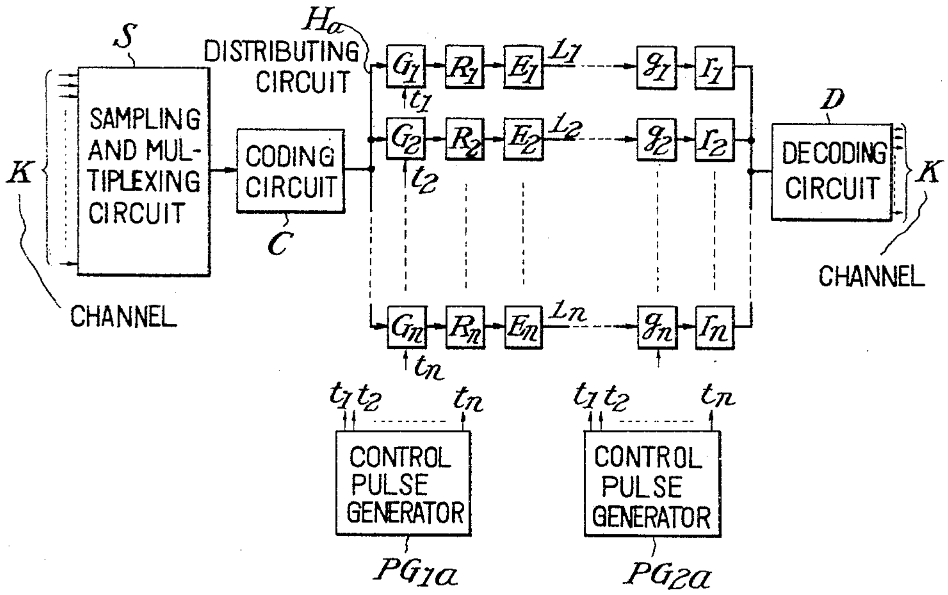
FIGURE 4 is a block diagram showing the compositional arrangement of another embodiment of the present invention.
Figure 5:
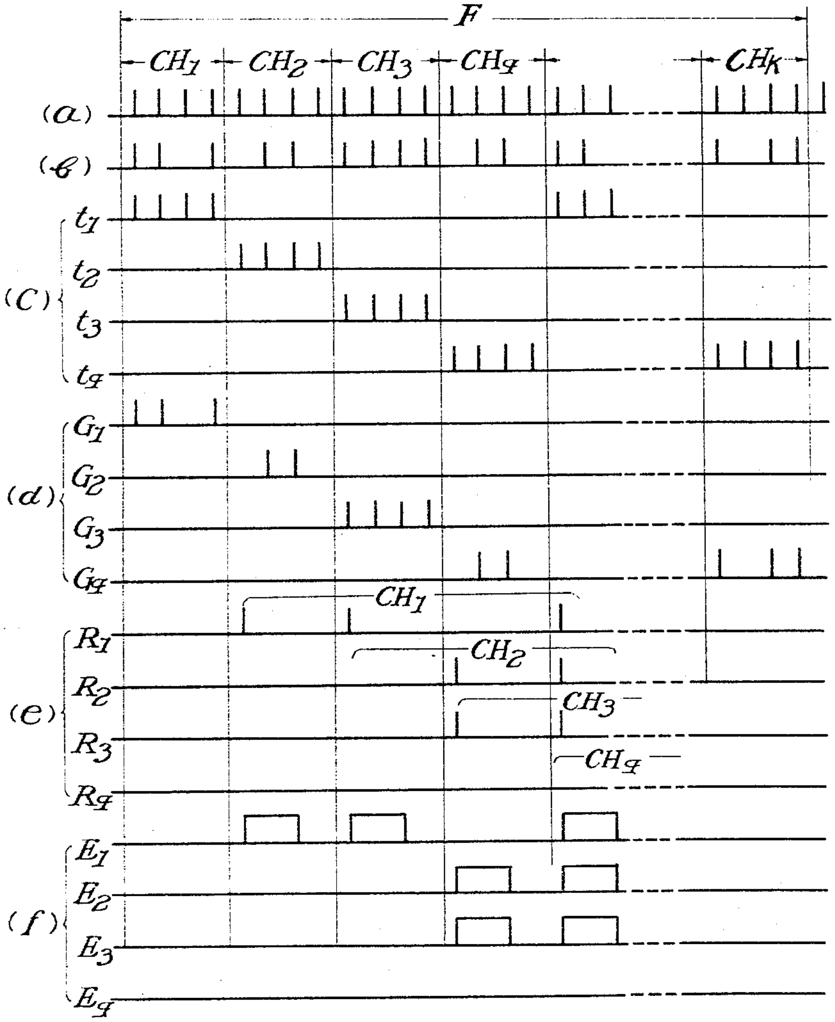
FIGURE 5 is a pulse waveform diagram, in representative form, of the embodiment of FIGURE 4.

In the system of FIGURE 4, the arrangement for the operational steps from sampling transmitting signals of K channels, through coding, up to obtaining a time-division, multiplex PCM pulse signal is the same as that in the case illustrated in FIGURE 2. Included in the transmitting terminal is a distributing circuit $H_a$ which accomplishes distribution of the PCM pulse signal to $n$ paths for each time slot, and which has gating circuits $G_1$, $G_2$, . . . $G_n$ and a pulse generator $PC_{1a}$. If the output signal of the coding circuit is of the waveform $b$ in FIGURE 5, the abovesaid pulse generator $PC_{1a}$ will generate pulse trans indicated by $c$ in FIGURE 5, and these pulse trains will successively be supplied to the gating circuits to control them. The output pulse trains of each of the abovesaid gating circuits are indicated in the group $d$.

Also included in the transmitting terminal are memory circuits $R_1$, $R_2$, . . . $R_n$ which once memorize the output signals of the respective gating circuits and send out pulse signals of $f_k/n$ repeating frequency at bit intervals by reading out with control pulses of $f_k/n$ frequency. The output pulse train of each of these circuits is shown in FIGURE 5(*e*) (in this case, $n=4$). As is apparent from FIG. 5(*e*), the repeating frequency of the output pulse trains in the abovementioned gating circuit is reduced to the repeating frequency of $f_k/n$ by the memory circuit. Pulse width stretching circuits $E_1$, $E_2$, . . . $E_n$ which are similar to those shown in FIGURE 2 are also provided in the embodiment of FIGURE 4, and their output waves are shown in FIGURE 5(*f*).

Figure 7:
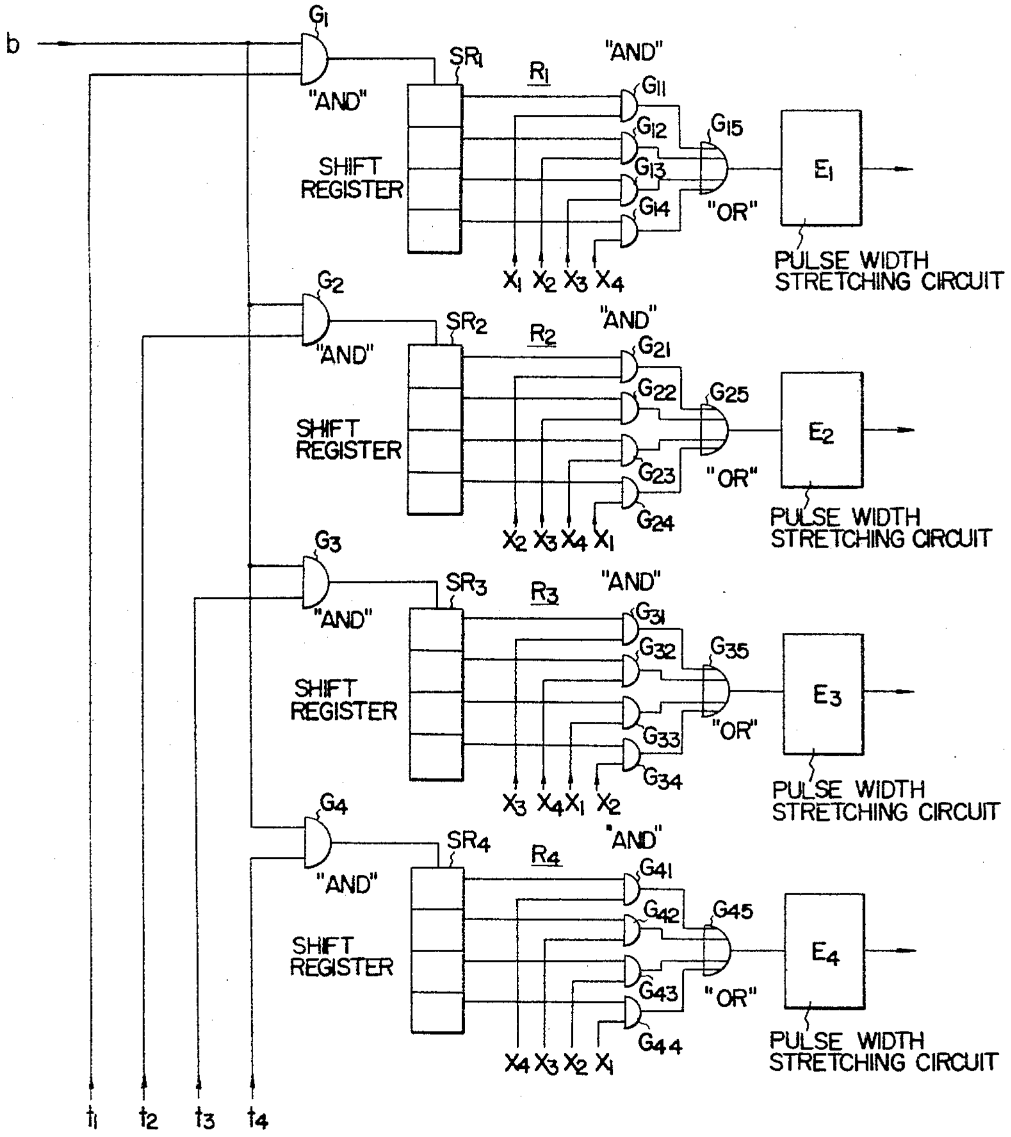
FIGURE 7 is a block diagram showing the detailed arrangement of the distributing circuit in FIGURE 4.

FIGURE 7 illustrates pulse distributing circuit $H_a$ in detail. In this case, there are provided four gating circuits $G_1$, $G_2$, $G_3$ and $G_4$ which are "AND" gates, four memory circuits $R_1$, $R_2$, $R_3$ and $R_4$, and four pulse stretching circuits $E_1$, $E_2$, $E_3$ and $E_4$. (That is, in this case, $n=4$.) Each of the memory circuits $R_1$, $R_2$, $R_3$ and $R_4$ comprises a shift register, four "AND" gates, each connected with the four output terminals of said register, and one "OR" gate connected with the said "AND" gates.

The time-division, multiplex PCM signal *b*, which is the output of the coding circuit C in FIGURE 4, is commonly supplied to one terminal of the "AND" gates $G_1$, $G_2$, $G_3$ and $G_4$. The control pulses $t_1$, $t_2$, $t_3$ and $t_4$ from the control pulse generator $PC_{1a}$ (their waveforms being indicated in FIGURE 5(*c*)) are supplied to another terminal of the "AND" gates, respectively. Accordingly, the "AND" gates supply pulse signals which are distributed for each time slot or each channel to the shift registers $SR_1$, $SR_2$, $SR_3$ and $SR_4$ of the memory circuits $R_1$, $R_2$, $R_3$ and $R_4$, under the control of the control pulses $t_1$, $t_2$, $t_3$ and $t_4$. The shift registers once memorize the pulse signals from the "AND" gates. Each of these registers includes four memory stages which are provided for each bit of the pulse signal, and bit information then is supplied to one terminal of the "AND" gates connected with the output terminals thereof.

Figure 8:
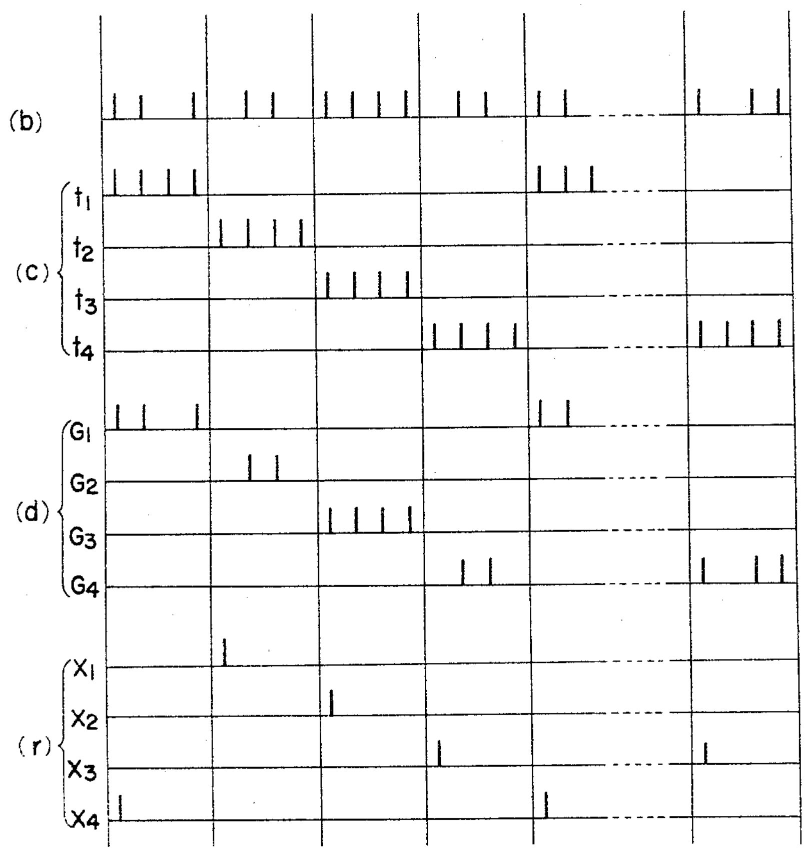
FIGURE 8 is a pulse waveform diagram explaining the distributing circuit shown in FIGURE 7.

A group of reading-out signals $X_1$, $X_2$, $X_3$ and $X_4$, the waveforms of which are shown in FIGURE 8(*r*) corresponding to other signals, are supplied to another terminal of the "AND" gates $G_{11}$, $G_{12}$, $G_{13}$ and $G_{14}$; $G_{21}$, $G_{22}$, $G_{23}$ and $G_{24}$; $G_{31}$, $G_{32}$, $G_{33}$ and $G_{34}$; $G_{41}$, $G_{42}$, $G_{43}$ and $G_{44}$, with a predetermined phase-shifted relation. (The circuit for generating such reading-out signals is omitted for simplification.) The repeating frequency of each of the reading-out signals is selected as $$\frac{f_k}{n \cdot B}$$

(in this case, $n=4$, $B=4$, then this frequency is $f_k/16$). Furthermore, these reading-out signals are shifted successively in phase at a staggered interval equal to the time slot T, as shown in FIGURE 8.

Consequently, those "AND" gates $G_{11}$–$G_{14}$, $G_{21}$–$G_{24}$, $G_{31}$–$G_{34}$ and $G_{41}$–$G_{44}$ supply such pulse signals as shown in FIGURE 5(*e*) through "OR" gates $G_{15}$, $G_{25}$, $G_{35}$ and $G_{45}$ to the pulse width stretching circuits $E_1$, $E_2$, $E_3$ and $E_4$. The stretched pulse signals are shown in FIGURE 5(*f*).

Referring back to FIGURE 4, the pulse signals which have been distributed to *n* paths in the above manner are transmitted through *n* transmission lines $L_1$, $L_2$, . . . $L_n$ to the receiving terminal. It will be apparent that the pulse repeating frequency on each of the transmission lines in this case can be caused to be less than the transmittable distortion-free frequency $f_e$ similarly as in the previously described embodiment.

As the receiving terminal, the above-mentioned pulse signals of all transmission lines which have been stretched in width, are reconverted by gating circuits $g_1$, $g_2$, . . . $g_n$ and by a control pulse generator $PG_{2a}$ into pulse signals of the same waveforms as these in FIGURE 5(*e*) which are of their original forms prior to the stretching of their width. The output signals of the gating circuits are supplied to pulse interval contracting circuits $r_1$, $r_2$ . . . $r_n$ for contracting the pulse interval thereof, and signals which are the same as the output signals of the gating circuits at the transmitting terminal (FIGURE 5(*d*)) are then regenerated through memory and reading function of the contracting circuits, (the frequency of the control pulse for reading out being $f_k$). These output signals are combined. After that, the transmitting signals of K channels are regenerated by means of a decoding circuit D.

If, in the embodiment shown in FIGURE 4, the quantity $K/n$ is an integral number, it will also be possible to utilize a system in which no pulse interval contracting circuit is used. In this case, the output signals of the gating circuit $E_1$ $E_2$, . . . $E_n$ at the receiving terminal are directly supplied to the decoding circuit so as to regenerate the original transmitting signals.

The embodiment shown in FIGURE 4 has the following additional advantages. According to the invention, it is possible to distribute pulses to transmission lines so as to be in the same distribution condition as in conventional systems. This means that any transmission lines (including any repeating equipment) installed for the use in the conventional systems can compatibly be utilized in the system of the invention. According to the invention, moreover, it is possible to increase the number of communication channels merely by installing additional transmission lines, without any additional installations of terminal equipment. Namely, if any terminal equipment had been designed and constructed so as to be capable of transmitting and receiving 192 channel signals, the capacity of the whole system can be increased, by only additionally installing the transmission lines of 24 channels, for example from the minimum capacity of 24 channels to the maximum of 192, by using the slot-distributing technique of the invention.

In each of the two above-mentioned embodiments, a modulating circuit at the transmitting terminal for transmitting PCM signals through the transmission lines by means of carrier current, and a detecting circuit at receiving terminal for detecting the transmitted signals are omitted for simplification of the explanation, but it will be apparent that those circuits likewise are provided as in the case of conventional systems.

In the two above-mentioned embodiments, the phases of the PCM signals distributed to the transmission lines are displaced line by line. However, it is also possible to cause such phases to coincide with each other by providing delay circuits in the transmitting terminal.

Although this invention has been described with respect to a few embodiments thereof, it will be understood that the same is not limited thereto but is susceptible of numerous changes and modifications as known to a person skilled in the art, and I therefore do not wish to be limited to the details shown and described herein but intend to cover such modifications and changes as are within the scope of the appended claims.

What I claim is:

1. A time-division, multiplex pulse-code-modulation communication system by pulse distribution transmission comprising:

a transmitting terminal station;

a receiving terminal station;

a plurality of parallel transmission lines, each connecting said transmitting terminal station and said receiving terminal station;

a common sampling and multiplexing means provided at said transmitting terminal station for converting a plurality of transmitting signals into a time-division, multiplex pulse-amplitude-modulation signal;

a common coding means provided at said transmitting terminal station for converting said time-division, multiplex pulse-amplitude-modulation signal into a time-division, multiplex pulse-code-modulation signal;

means for distributing said time-division, multiplex pulse-code-modulation signal to said plurality of parallel transmission lines for each time slot wherein a group of bit pulses for each channel is included; means for reducing a repeating frequency of said bit pulses from said distribtuing means to a predetermined value;

means for combining a plurality of pulse signals transmitted through said plurality of transmission lines to regenerate said time-division, multiplex pulse-code-modulation signal; and a common decoding means provided at said receiving terminal station for regenerating said original transmitting signals.

2. The time-division, multiplex pulse-code-modulation communication system by pulse distribution transmission as defined in claim 1, wherein said pulse distributing means comprises:

a plurality of gating circuits provided for each said plurality of transmission lines, for distributing a group of bit pulses within said time slot of said time-division, multiplex pulse-code-modulation signal to said transmission lines with a predetermined reoccurring pulse sequence; and said frequency reducing means comprising a plurality of memory circuits, each being connected to said respective gating circuits, for reducing a repeating frequency of said bit pulses from said gating circuits to a predetermined value.

3. The time-division, multiplex pulse-code-modulation communication system by pulse distribution transmission as defined in claim 1, wherein said reduced repeating frequency of said bit pulses is selected at a value corresponding to a time interval of existence of said bit pulses for each channel.

4. The time-division, multiplex pulse-code-modulation communication system by pulse distribution transmission as defined in claim 2, wherein said pulse distributing means further comprises a control pulse generating circuit for generating timing pulses for controlling opening and closing of said gating circuit.

5. The time-division, multiplex pulse-code-modulation communication system by pulse distribution transmission as defined in claim 2, wherein said distributing means further comprises a plurality of pulse width stretching circuits, each of which is connected to the respective memory circuits, and said stretching circuits stretch the width of said bit pulses from said memory circuit.

6. The time-division, multiplex pulse-code-modulation communication system by pulse distribution transmission as defined in claim 1, wherein said pulse combining means provided at said receiving terminal comprises a plurality of gating circuits provided for each of said plurality of transmission lines, a control pulse generator for generating timing pulses for controlling opening and closing of said gating circuits, and said gating circuits being controlled by said timing pulses from said control pulse generator so as to combine pulse signals transmitted through said transmission lines.

7. The time-division, multiplex pulse-code-modulation communication system by pulse distribution transmission as defined in claim 6, wherein said pulse combining means further comprises a plurality of pulse interval contracting circuits for contracting time intervals of said pulse signals from said gating circuits to the original interval thereof.

8. A time-division, multiplex pulse-code-modulation communication system by pulse distribution transmission comprising:

a transmitting terminal station;

a receiving terminal station;

a plurality of parallel transmission lines, each connecting said transmitting terminal station and said receiving terminal station;

a common sampling and multiplexing means provided at said transmitting terminal station for converting a plurality of transmitting signals into a time-division, multiplex pulse-amplitude-modulation signal;

a common coding means provided at said transmitting terminal station for converting said time-division, multiplex pulse-amplitude-modulation signal into a time-division, multiplex pulse-code-modulation signal;

pulse distributing means comprising a plurality of gating circuits for each said plurality of transmission lines, for distributing a group of bit pulses within said time slot of said signal to said transmission lines with a reoccurring pulse sequence;

a corresponding number of AND gates; and a plurality of memory circuits, each connected to the respective gating circuits, for reducing a repeating frequency of said bit pulses from said gating circuits to a predetermined value; each of the memory circuits comprising a shift register, the AND gates connected to the output of said shift register; and one OR gate connected to said AND gates;

a plurality of pulse width stretching circuits, each connected to the respective memory circuits, stretching the width of said bit pulses from said memory circuit;

means for combining a plurality of pulse signals transmitted through said plurality of transmission lines to regenerate said time-division, multiplex pulse-code-modulation signal; and a common decoding means provided at said receiving terminal station for regenerating said original transmitting signals.

References Cited

UNITED STATES PATENTS

| | | | |
|---|---|---|---|
| 3,159,720 | 12/1964 | Bergmann et al. | 179—15 |
| 2,920,143 | 1/1960 | Filipowsky | 179—15 |
| 2,876,418 | 3/1959 | Villars | 332—11 |
| 2,608,617 | 8/1952 | Affel et al. | 179—15 |
| 2,527,638 | 10/1950 | Kreer et al. | 179—15 |

OTHER REFERENCES

Carbrey, "Vidio Transmission Over Telephone Cable Pairs by Pulse Code Modulation," Proceedings Of The IRE, vol. 48, No. 9, September 1960, pp. 1546–1561 relied on.

RALPH D. BLAKESLEE, *Primary Examiner.*

U.S. Cl. X.R.

325—39, 41; 332—11